United States Patent
Tanaka

(10) Patent No.: US 9,609,160 B2
(45) Date of Patent: Mar. 28, 2017

(54) IMAGE FORMING APPARATUS, COMMUNICATION MONITORING SYSTEM, AND COMMUNICATION MONITORING CIRCUIT

(71) Applicant: FUJI XEROX CO., LTD., Tokyo (JP)

(72) Inventor: Hisayuki Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/706,072

(22) Filed: May 7, 2015

(65) Prior Publication Data

US 2016/0150100 A1 May 26, 2016

(30) Foreign Application Priority Data

Nov. 26, 2014 (JP) ................................. 2014-239195

(51) Int. Cl.
*G06F 15/00* (2006.01)
*H04N 1/00* (2006.01)

(52) U.S. Cl.
CPC ....... *H04N 1/0083* (2013.01); *H04N 1/00323* (2013.01); *H04N 1/00888* (2013.01); *H04N 2201/0094* (2013.01)

(58) Field of Classification Search
CPC .................. H04N 1/00888; H04N 2201/0094
USPC ....................................................... 358/1.15
See application file for complete search history.

(56) References Cited

U.S. PATENT DOCUMENTS

| | | | | | |
|---|---|---|---|---|---|
| 5,274,470 | A | * | 12/1993 | Karita | H04N 1/0402 358/448 |
| 5,897,235 | A | * | 4/1999 | Honma | G03G 15/5066 399/79 |
| 2006/0274384 | A1 | * | 12/2006 | Hayashi | H04N 1/32561 358/498 |

FOREIGN PATENT DOCUMENTS

| | | |
|---|---|---|
| JP | 4-178048 A | 6/1992 |
| JP | 11-65603 A | 3/1999 |

* cited by examiner

*Primary Examiner* — Saeid Ebrahimi Dehkord
(74) *Attorney, Agent, or Firm* — Sughrue Mion, PLLC

(57) ABSTRACT

An image forming apparatus includes an image forming unit, a controller including a master unit and a slave unit, and a serial communication line connecting the master unit and the slave unit and used in serial communication. The master unit includes an arithmetic module that generates first serial data to be transmitted to the slave unit to monitor serial communication, and monitors whether the first serial data has been successfully received in accordance with second serial data received from the slave unit. The slave unit includes a pulse signal output module that outputs pulse signals for a number of pulses which is set from the first serial data, an analog voltage output module that receives the pulse signals, changes an analog voltage in accordance with the number of pulses, and outputs the analog voltage, and an analog/digital conversion module that converts the analog voltage into the second serial data.

14 Claims, 9 Drawing Sheets

FIG. 7

| TAP POSITION OF DP | DIGITAL SIGNAL OUTPUT CORRESPONDING TO TAP OF DP | | |
|---|---|---|---|
| | MINIMUM VALUE | MEDIAN | MAXIMUM VALUE |
| 1 | DPOB(1) | DPOC(1) | DPOT(1) |
| 2 | DPOB(2) | DPOC(2) | DPOT(2) |
| | | | |
| n | DPOB(n) | DPOC(n) | DPOT(n) |
| | | | |
| SN | DPOB(SN) | DPOC(SN) | DPOT(SN) |

FIG. 8

| m | COUNT PATTERN CP [m] | CPT [m] | REMARKS |
|---|---|---|---|
| 1 | 1 0 1 0 1 0 1 | 85 | BIT TOGGLE |
| 2 | 0 1 0 1 0 1 0 | 42 | |
| 3 | 0 0 0 1 1 0 0 | 12 | BIT DOUBLE |
| 4 | 0 1 1 0 0 1 1 | 51 | |
| 5 | 0 0 0 0 0 0 1 | 1 | SUCCESSIVE BITS |
| 6 | 0 1 1 1 1 1 1 | 63 | |

IMAGE FORMING APPARATUS, COMMUNICATION MONITORING SYSTEM, AND COMMUNICATION MONITORING CIRCUIT

CROSS-REFERENCE TO RELATED APPLICATIONS

This application is based on and claims priority under 35 USC 119 from Japanese Patent Application No. 2014-239195 filed Nov. 26, 2014.

BACKGROUND (i) Technical Field

The present invention relates to an image forming apparatus, a communication monitoring system, and a communication monitoring circuit.

(ii) Related Art

Master/slave control involving a master controller that has a central processing unit (CPU) and a slave controller that controls a control target under control of the master controller is widely accepted, in which data is transmitted and received between the master controller and the slave controller by serial (Serial Peripheral Interface (SPI)) communication.

SUMMARY

According to an aspect of the invention, there is provided an image forming apparatus including an image forming unit, a controller, and a serial communication line. The image forming unit forms an image. The controller controls formation of an image by the image forming unit and includes a master unit and a slave unit. The serial communication line connects the master unit and the slave unit of the controller with each other and is used in serial communication. The master unit of the controller includes an arithmetic module that generates first serial data for communication monitoring which is transmitted to the slave unit and which is used to monitor serial communication with the slave unit via the serial communication line, and monitors whether the first serial data has been successfully received by the slave unit in accordance with second serial data received from the slave unit via the serial communication line. The slave unit of the controller includes a pulse signal output module that outputs pulse signals for a number of pulses, the number of pulses being set from the first serial data received from the master unit via the serial communication line in accordance with the first serial data, an analog voltage output module that receives the pulse signals for the number of pulses, changes an analog voltage in accordance with the number of pulses, and outputs the analog voltage, and an analog/digital conversion module that converts the analog voltage output from the analog voltage output module into the second serial data by performing analog/digital conversion.

BRIEF DESCRIPTION OF THE DRAWINGS

An exemplary embodiment of the present invention will be described in detail based on the following figures, wherein:

FIG. 4A illustrates a data sequence transmitted from the master controller to the slave controller, and FIG. 4B illustrates a data sequence transmitted from the slave controller to the master controller;

FIG. 7 is a diagram for describing an example of the reference table;

FIG. 8 is a diagram illustrating examples of a count pattern CP in communication monitoring data TCDs;

DETAILED DESCRIPTION

Hereinafter, an exemplary embodiment of the present invention will be described in detail with reference to the attached drawings.

Here, an image forming apparatus will be described, for example, as an apparatus that includes a master controller and a slave controller between which data is transmitted and received by serial (Serial Peripheral Interface (SPI)) communication in accordance with a master/slave scheme.

Image Forming System

Figure 1:
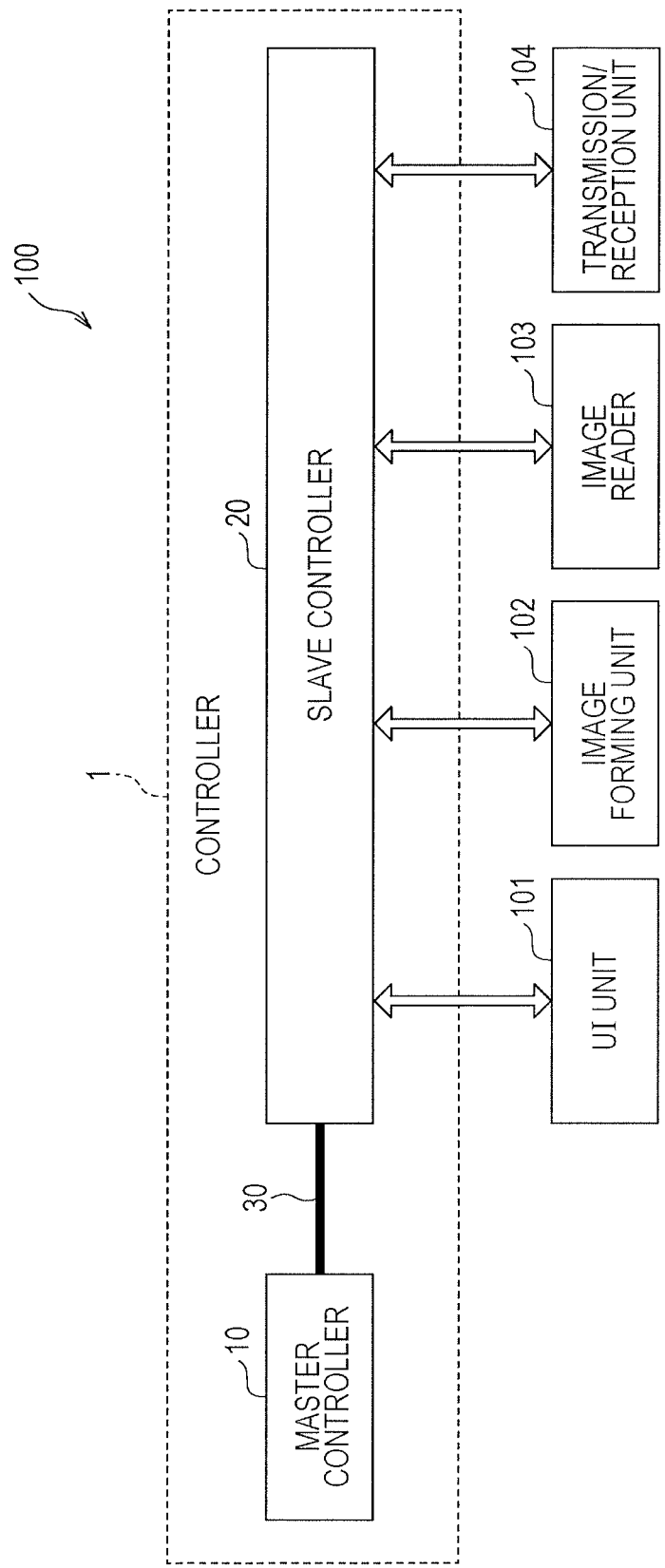
FIG. 1 is a diagram illustrating an example of an image forming apparatus to which an exemplary embodiment of the present invention is applicable.

FIG. 1 is a diagram illustrating an example of an image forming apparatus 100 to which this exemplary embodiment is applicable.

The image forming apparatus 100 is a multifunction machine that has a scan function, a print function, a copy function, and a facsimile function.

The image forming apparatus 100 includes an image reader 103, an image forming unit 102, a user interface unit 101 (hereinafter referred to as the UI unit 101), and a transmission/reception unit 104. The image reader 103 reads an image recorded on a recording medium, such as paper. The image forming unit 102 forms an image on a recording medium. The UI unit 101 accepts instructions, provided by a user, relating to power-on/power-off and operations using the scan function, print function, copy function, and facsimile function, and displays messages to the user. The transmission/reception unit 104 transmits and receives data to/from a terminal apparatus (not illustrated), a facsimile apparatus (not illustrate), and a server apparatus (not illustrated) externally provided and connected via communication lines (not illustrated).

The image forming apparatus 100 further includes a controller 1 that controls operations of the image reader 103, the image forming unit 102, the UI unit 101, and the transmission/reception unit 104. Note that the image reader 103, the image forming unit 102, the UI unit 101, and the transmission/reception unit 104 are referred to as functional blocks if these units need not be distinguished from one another.

It is assumed that each functional block includes plural control targets that are controlled by the controller 1.

The controller 1 includes a master controller 10 that is located apart from the UI unit 101, the image forming unit 102, the image reader 103, and the transmission/reception unit 104, a slave controller 20 that is located closer to the UI unit 101, the image forming unit 102, the image reader 103, and the transmission/reception unit 104, and a serial communication line 30 that connects the master controller 10 and the slave controller 20 with each other.

Data is transmitted and received between the master controller 10 and the slave controller 20 via the serial communication line 30.

The master controller 10 may be referred to as a master unit, and the slave controller 20 may be referred to as a slave unit.

The master controller 10 in the controller 1 includes a central processing unit (hereinafter referred to as a CPU, which corresponds to a CPU 11 in FIG. 2 described below), which is an example of an arithmetic module including an arithmetic logical unit (ALU) that performs logical operations and arithmetic operations, and so on.

On the other hand, the slave controller 20 in the controller 1 does not have a CPU and transmits data (a control command for controlling a control target, control data, and so on) received from the master controller 10 to the control target in a functional block. The slave controller 20 transmits data (status data that represents the condition of a control target, sensor data in a case where the control target is a sensor, and so on) transmitted from the control target in a functional block to the master controller 10.

That is, the master controller 10 functions as an active apparatus while the slave controller 20 functions as a passive apparatus.

Here, data (a control command for controlling a control target, control data, and so on) transmitted from the master controller 10 to the slave controller 20 in the controller 1 is referred to as data for control, and data (status data that represents the condition of a control target, sensor data in a case where the control target is a sensor, and so on) transmitted from the slave controller 20 to the master controller 10 is referred to as data for a response. Data for control and data for a response are referred to as data if data for control and data for a response need not be distinguished from each other.

Note that the slave controller 20 corresponds to extended input/output (I/O) that extends an I/O function of the master controller 10.

In FIG. 1, although one slave controller 20 is provided for all of the functional blocks, namely, the UI unit 101, the image forming unit 102, the image reader 103, and the transmission/reception unit 104, one slave controller 20 may be provided for each of the functional blocks, or one slave controller 20 may be provided for each of the plural functional blocks.

In the image forming apparatus 100, the scan function is implemented by the image reader 103, the print function is implemented by the image forming unit 102, the copy function is implemented by the image reader 103 and the image forming unit 102, and the facsimile function is implemented by the image reader 103, the image forming unit 102, and the transmission/reception unit 104.

Controller 1

Figure 2:
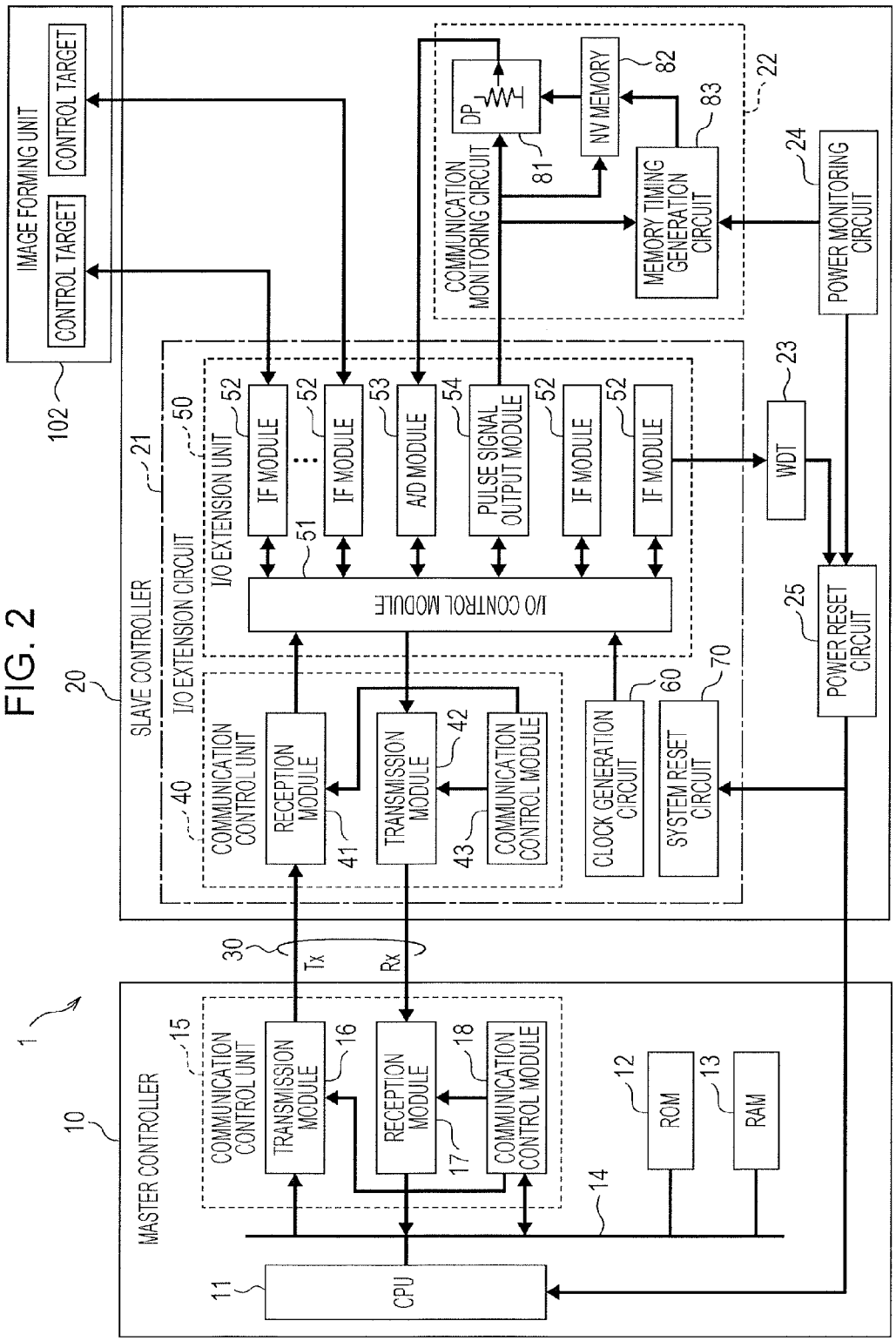
FIG. 2 is a diagram illustrating an example of a configuration of a controller.

FIG. 2 is a diagram illustrating an example of a configuration of the controller 1. A description is given below while assuming that a control target included in the image forming unit 102 is controlled, for example.

The controller 1 includes the master controller 10 and the slave controller 20 as described above. The master controller 10 and the slave controller 20 are connected to each other via the serial communication line 30. The serial communication line 30 includes two types of communication channels, namely, a communication channel Tx for transmission and a communication channel Rx for reception, when viewed from the master controller 10.

That is, data is transmitted from the master controller 10 to the slave controller 20 via the communication channel Tx, and data is transmitted from the slave controller 20 to the master controller 10 via the communication channel Rx.

A system that is constituted by the master controller 10, the slave controller 20, and the serial communication line 30 and that monitors serial communication is an example of a communication monitoring system.

A detailed description of the master controller 10 and the slave controller 20 in the controller 1 is given below.

Master Controller 10

The master controller 10 includes the CPU 11, a read-only memory (ROM) 12, a random access memory (RAM) 13, and a communication control unit 15. The master controller 10 further includes a data bus 14 via which data is transmitted and received among the CPU 11, the ROM 12, the RAM 13, and the communication control unit 15.

When the power is turned on, the CPU 11 reads a program and data stored in the ROM 12, loads the program and data to the RAM 13 via the data bus 14, and executes the program.

The communication control unit 15 includes a transmission module 16, a reception module 17, and a communication control module 18. The transmission module 16 is connected to the communication channel Tx of the serial communication line 30, and the reception module 17 is connected to the communication channel Rx of the serial communication line 30.

The communication control module 18 controls transmission and reception of data by the transmission module 16 and the reception module 17 in accordance with control performed by the CPU 11.

Slave Controller 20

The slave controller 20 includes an I/O extension circuit 21, a communication monitoring circuit 22, a watchdog timer circuit 23 (hereinafter referred to as the WDT 23), a power monitoring circuit 24, which is an example of a power monitoring module, and a power reset circuit 25, which is an example of a power reset module.

I/O Extension Circuit 21

The I/O extension circuit 21 includes a communication control unit 40, an I/O extension unit 50, a clock generation circuit 60, and a system reset circuit 70.

The communication control unit 40 includes a reception module 41, a transmission module 42, and a communication control module 43 as in the communication control unit 15 in the master controller 10. The reception module 41 is connected to the communication channel Tx of the serial communication line 30, and the transmission module 42 is connected to the communication channel Rx of the serial communication line 30.

That is, in serial communication between the master controller 10 and the slave controller 20, the communication control unit 15 of the master controller 10 constitutes a master interface, and the communication control unit 40 in the I/O extension circuit 21 of the slave controller 20 constitutes a slave interface.

The I/O extension unit 50 includes an I/O control module 51, an interface (IF) module 52, an analog/digital (A/D) module 53, which is an example of an analog/digital conversion module, and a pulse signal output module 54. Note that a single IF module 52 or plural IF modules 52 may be provided.

The IF module 52, the A/D module 53, and the pulse signal output module 54 are connected to the I/O control module 51 in parallel, and the I/O control module 51 is connected to the communication control unit 40 and the clock generation circuit 60.

The I/O control module 51 transmits data received by the reception module 41 of the communication control unit 40 to a specified one of the IF module 52, the A/D module 53, and the pulse signal output module 54. The I/O control module 51 transmits data received from any of the IF module 52, the A/D module 53, and the pulse signal output module 54 to the transmission module 42 of the communication control unit 40.

In FIG. 2, it is assumed that two IF modules 52 are respectively connected to two control targets in the image forming unit 102, for example. That is, when any of the IF modules 52 receives data, the data is transmitted to a corresponding one of the control targets in the image forming unit 102 to thereby control the control target.

Data from any of the control targets in the image forming unit 102 is transmitted to a corresponding one of the IF modules 52 and is further transmitted to the master controller 10 via the I/O control module 51 and the communication control unit 40.

Note that the control targets in the image forming unit 102 are a motor, a heater, a temperature sensor, a humidity sensor, a speed sensor, and so on, for example.

The same applies to the UI unit 101, the image reader 103, and the transmission/reception unit 104.

One of the IF modules 52 is connected to the WDT 23 described below.

A description of the pulse signal output module 54 and the A/D module 53 will be given in a description of the communication monitoring circuit 22 below.

The clock generation circuit 60 generates a clock signal CK and transmits the clock signal CK to the I/O control module 51 in the I/O extension unit 50. That is, transmission and reception of data between the I/O control module 51, and the I/F module 52, A/D module 53, and pulse signal output module 54 is performed in synchronization with the clock signal CK generated by the clock generation circuit 60.

The system reset circuit 70 resets the I/O extension circuit 21 in response to reception of a signal from the power reset circuit 25 described below.

Note that, in a case where the I/O extension circuit 21 is constituted by an application-specific integrated circuit (ASIC), the system reset circuit 70 is a circuit that resets the ASIC. Therefore, in a case where an ASIC is not used, the power reset circuit 25 described below may reset the I/O extension circuit 21.

Communication Monitoring Circuit 22

The communication monitoring circuit 22 includes a digital potentiometer 81 (hereinafter referred to as the DP 81), which is an example of an analog voltage output module, a rewritable nonvolatile memory 82 (hereinafter referred to as the NV memory 82), and a memory timing generation circuit 83, which is an example of a memory timing generation module.

The DP 81 includes plural resistors connected in series (resistor array), for example. One of the connection points of the respective plural resistors connected in series is connected to an output terminal (a terminal $R_W$ in FIG. 3 described below). The connection point of the resistor connected to the terminal $R_W$ changes in accordance with received pulse signals to thereby change the output voltage.

Here, a connection point is referred to as a tap. Alternatively, a connection point may be referred to as a step.

The NV memory 82 is a rewritable nonvolatile memory and retains written data without power supply. Here, the NV memory 82 stores data that indicates the position (tap position) of the connection point (tap) of a resistor in the DP 81, the connection point being connected to the terminal $R_W$. Note that an electrically erasable programmable read-only memory (EEPROM), a flash memory, or the like is used as the NV memory 82.

The memory timing generation circuit 83 generates a memory timing, which is constituted by a sequence of control signals, for writing data that indicates the tap position of a tap in the DP 81, the tap being connected to the terminal $R_W$, to the NV memory 82. Note that it is desired that the memory timing generation circuit 83 be configured on the basis of hardware logic and automatically generate a memory timing in response to reception of a signal from the power monitoring circuit 24 described below.

That is, at a memory timing generated by the memory timing generation circuit 83, data that indicates the tap position of the DP 81 set at the timing is written to the NV memory 82.

The communication monitoring circuit 22 is connected to the pulse signal output module 54 of the I/O extension unit 50 in the I/O extension circuit 21. The communication monitoring circuit 22 receives, from the pulse signal output module 54, a pulse signal for moving the tap position of the DP 81.

The output terminal of the communication monitoring circuit 22 (the terminal $R_W$ in FIG. 3) is connected to the A/D module 53 of the I/O extension unit 50 in the I/O extension circuit 21.

WDT 23

The WDT 23 is connected to one of the IF modules 52 in the I/O extension unit 50. The WDT 23 is connected to the power reset circuit 25 described below.

The WDT 23 does not output a signal to the power reset circuit 25 as long as the WDT 23 receives a signal for resetting a timer included in the WDT 23 in accordance with a predetermined cycle. In a case where the WDT 23 fails to receive the signal for resetting the timer of the WDT 23 in accordance with the predetermined cycle, the timer times out, and the WDT 23 transmits a signal to the power reset circuit 25. As a result, the power of the slave controller 20 is reset.

Power Monitoring Circuit 24

The power monitoring circuit 24 monitors the voltage (supply voltage) of the power supplied to the slave controller 20. In a case where the power monitoring circuit 24 detects the supply voltage dropping below a predetermined minimum voltage, the power monitoring circuit 24 transmits a signal to the memory timing generation circuit 83 of the communication monitoring circuit 22 and to the power reset circuit 25.

Note that in a case where the supply voltage drops below the minimum voltage, the power monitoring circuit 24 isolates the communication monitoring circuit 22 from a power supply circuit (not illustrated). Accordingly, it is possible to suppress a sudden drop of the supply voltage even if the supply voltage drops below the minimum voltage, and the communication monitoring circuit 22 is able to continue operating for a while.

For example, a capacitor is provided to a part of the communication monitoring circuit 22 to which power is supplied. The power supply circuit supplies power to the communication monitoring circuit 22 while the slave controller 20 is operating normally, and charges the capacitor. In a case where the supply voltage drops below the minimum voltage, the power monitoring circuit 24 isolates the communication monitoring circuit 22 from the power supply circuit by using a switch or the like. Accordingly, the communication monitoring circuit 22 continues operating for a while using power stored in the capacitor. It is desired that the operating voltage of the communication monitoring circuit 22 be set to a value lower than the minimum voltage. In doing so, the communication monitoring circuit 22 continues operating for a duration longer than in a case where the operating voltage is set to a value not lower than the minimum voltage.

It is sufficient that the duration during which the communication monitoring circuit 22 continues operating is equal to or longer than a time needed to write data that indicates the tap position of the DP 81 to the NV memory 82.

Power Reset Circuit 25

The power reset circuit 25 is a circuit that resets the power of the slave controller 20. The power reset circuit 25 is connected to the WDT 23 and the power monitoring circuit 24. In a case where the power reset circuit 25 receives a signal from either of the WDT 23 and the power monitoring circuit 24, the power reset circuit 25 transmits a signal to the system reset circuit 70 in the I/O extension circuit 21 and to the CPU 11 in the master controller 10. Then, the system reset circuit 70 resets the I/O extension circuit 21, and the power reset circuit 25 resets the power of the communication monitoring circuit 22. That is, the power reset circuit 25 resets the power of the slave controller 20.

Note that resetting power is an operation of instantaneously cutting power and thereafter resupplying power. In doing so, the slave controller 20 is restarted (started up again) from the initial state.

Details of Communication Monitoring Circuit 22

Figure 3:
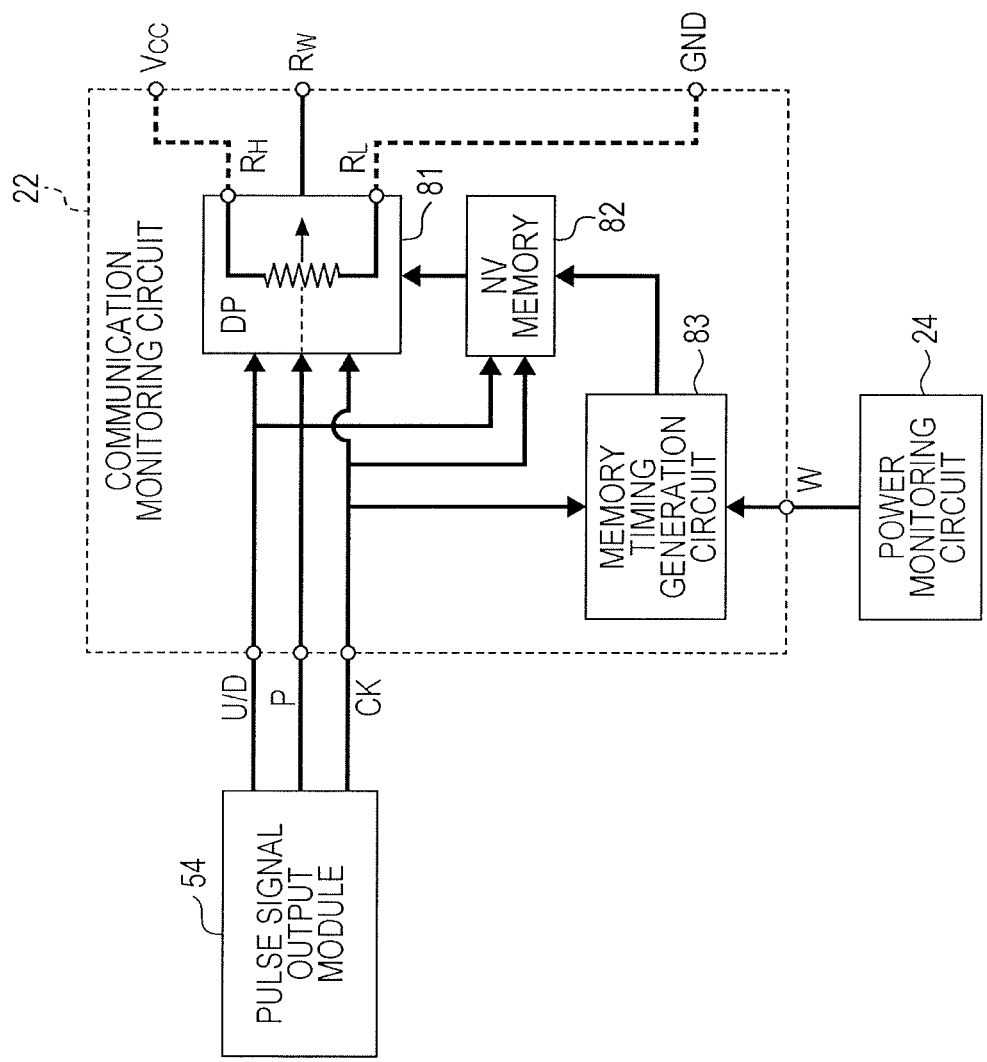
FIG. 3 is a diagram for describing a communication monitoring circuit.

FIG. 3 is a diagram for describing the communication monitoring circuit 22.

As described above, the communication monitoring circuit 22 includes the DP 81, the NV memory 82, and the memory timing generation circuit 83.

The DP 81 includes plural resistors connected in series (resistor array). One end of the resistor array is a terminal $R_L$, and the other end is a terminal $R_H$. One of the connection points (taps) of the respective plural resistors connected in series is connected to the terminal $R_W$.

Here, it is assumed that the terminal $R_L$ is connected to a reference potential GND (ground potential GND), and the terminal $R_H$ is connected to a supply potential $V_{CC}$ (supply voltage of the communication monitoring circuit 22). In this case, the voltage of the terminal $R_W$ has a value between the supply potential $V_{CC}$ and the reference potential GND. The voltage of the terminal $R_W$ is set on the basis of an interval (resolution) that is determined in accordance with the number of resistors connected in series, that is, the number of taps (SN described below). The number of taps is 128, 256, or the like, for example, and therefore, the terminal $R_W$ outputs an analog signal (analog voltage).

Note that the terminal $R_W$ of the DP 81 continues outputting an analog signal.

The DP 81 includes a terminal U/D (represented by U/D in FIG. 3) that receives an up/down signal U/D, a terminal P (represented by P in FIG. 3) that receives a pulse signal P, and a terminal CK (represented by CK in FIG. 3) that receives a clock signal CK. In a case where the DP 81 receives one pulse signal P, the tap position of a tap connected to the terminal $R_W$ moves (changes) by one step. In this case, if the up/down signal U/D is set to "up" (U), the tap position moves to a large side (in a direction where the voltage of the terminal $R_W$ increases) by one step. On the other hand, if the up/down signal U/D is set to "down" (D), the tap position moves to a small side (in a direction where the voltage of the terminal $R_W$ decreases) by one step. In a case where plural pulse signals P are fed, the tap position of a tap connected to the terminal $R_W$ moves by a number of steps equal to the number of pulses.

In a case where the power monitoring circuit 24 detects the supply voltage dropping below the minimum voltage, the power monitoring circuit 24 transmits a signal to the memory timing generation circuit 83 of the communication monitoring circuit 22 via a terminal W (represented by W in FIG. 3).

As described above, the communication monitoring circuit 22 includes the terminal U/D, the terminal P, the terminal CK, and the terminal W that receive digital signals, and the terminal $R_W$ that outputs an analog signal, in addition to the terminals to which the supply potential $V_{CC}$ and the reference potential GND are fed.

Note that an integrated circuit (IC) that integrates the DP 81 and the NV memory 82 may be used.

Overview of Operations Performed by Controller 1

A description of the overview of operations performed by the controller 1 (see FIG. 2) is given.

In the controller 1 to which this exemplary embodiment is applicable, whether serial communication is normally performed between the master controller 10 and the slave controller 20 is monitored (communication monitoring), and, in a case where the power of the slave controller 20 has been reset, a factor responsible for the power reset is inferred (inference about a power reset factor).

Communication Monitoring

First, a description is given of a case (communication monitoring) where whether serial communication is normally performed between the master controller 10 and the slave controller 20 is monitored.

Figure 4A:
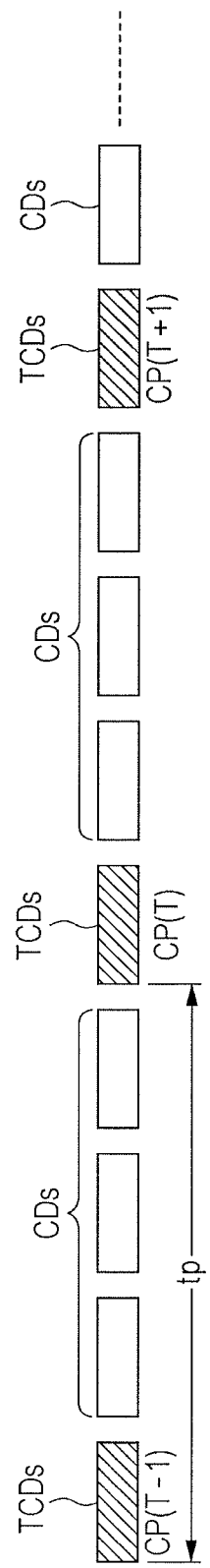
FIGS. 4A and 4B are diagrams illustrating data sequences transmitted and received between a master controller and a slave controller, where
Figure 4B:
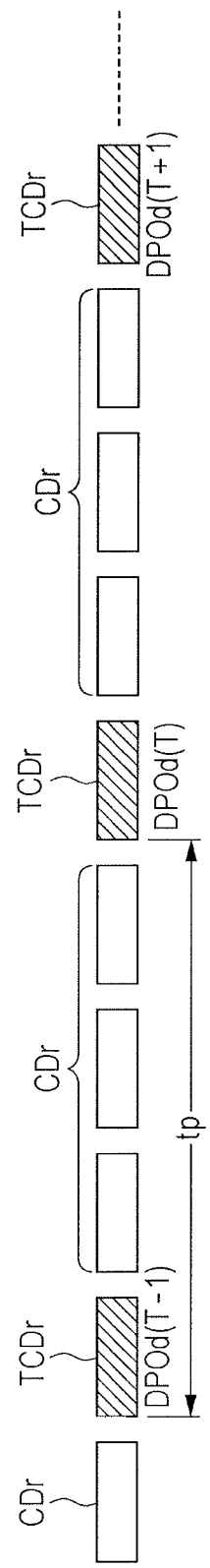

FIGS. 4A and 4B are diagrams illustrating data sequences transmitted and received between the master controller 10 and the slave controller 20. FIG. 4A illustrates a data sequence transmitted from the master controller 10 to the slave controller 20, and FIG. 4B illustrates a data sequence transmitted from the slave controller 20 to the master controller 10.

As illustrated in FIG. 4A, data CDs for control and communication monitoring data TCDs for communication monitoring are transmitted from the master controller 10 to the slave controller 20 in accordance with a predetermined cycle tp.

As illustrated in FIG. 4B, data CDr for a response and communication monitoring response data TCDr that is a response to communication monitoring data TCDs are transmitted from the slave controller 20 to the master controller 10. It is assumed that communication monitoring response data TCDr is also transmitted in accordance with the cycle tp, for example.

The cycle tp is 10 ms, for example.

Communication monitoring data TCDs includes data that specifies the number of pulses used to move the tap position of the DP 81. In FIG. 4A, a count pattern CP is illustrated, which is data that is included in communication monitoring data TCDs and that specifies the number of pulses.

Communication monitoring response data TCDr includes digital signal output DPOd that indicates the tap position of the DP 81 as described below. In FIG. 4B, digital signal output DPOd included in communication monitoring response data TCDr is illustrated.

Communication monitoring data TCDs that includes a count pattern CP is serial data and is an example of first serial data. Communication monitoring response data TCDr that includes digital signal output DPOd is also serial data and is an example of second serial data.

Note that "(T)" appended to the count pattern CP and to the digital signal output DPOd represents a timing, where "T−1" represents a timing immediately before a timing T, and "T+1" represents a timing immediately after the timing T.

The count pattern CP and the digital signal output DPOd will be described below.

Communication monitoring data TCDs received by the communication control unit 40 in the slave controller 20 is transmitted to the pulse signal output module 54 via the I/O control module 51 of the I/O extension unit 50 (see FIG. 2).

Then, the pulse signal output module 54 transmits, to the communication monitoring circuit 22, a number of pulses specified by the count pattern CP in the communication monitoring data TCDs. As a result, the tap position of the DP 81 in the communication monitoring circuit 22 moves (see FIG. 3).

As described below, the pulse signal output module 54 transmits an up/down signal U/D before transmitting a number of pulses specified in the communication monitoring data TCDs to thereby set the direction in which the tap position is moved to "up" (U) or "down" (D).

As illustrated in FIG. 2, analog signal output DPOa (where "a" indicates that the output has an analog value) from the terminal $R_W$ of the DP 81 in the communication monitoring circuit 22 is input into the A/D module 53 in the I/O extension unit 50. Then, the A/D module 53 converts the analog signal output DPOa from the DP 81 into a serial signal and outputs digital signal output DPOd (where "d" indicates that the output has a digital value). The digital signal output DPOd output from the A/D module 53 is transmitted to the master controller 10 via the I/O control module 51 and the communication control unit 40.

The analog signal output DPOa is an analog signal that indicates the tap position of the DP 81, and the digital signal output DPOd obtained as a result of A/D conversion from the analog signal output DPOa is a digital signal that indicates the tap position of the DP 81.

The master controller 10 determines whether the count pattern CP transmitted using the communication monitoring data TCDs has been successfully received, on the basis of the received digital signal output DPOd. If it is determined that the count pattern CP has been successfully received, the master controller 10 continues communication monitoring. If it is determined that the count pattern CP has not been successfully received, the master controller 10 determines that a failure in communication, such as a communication error, has occurred and records an error in a log. The master controller 10 retransmits data that has been transmitted after a time point at which the master controller 10 last determined that the count pattern CP was successfully received, or resets the power of the slave controller 20.

Here, a case of applying this exemplary embodiment is compared with a case of not applying this exemplary embodiment, that is, a case where the slave controller 20 does not include the communication monitoring circuit 22.

The case of not applying this exemplary embodiment is a case where communication monitoring data TCDs and communication monitoring response data TCDr are not transmitted and received between the master controller 10 and the slave controller 20.

In the case of not applying this exemplary embodiment, the master controller 10 one-sidedly transmits data (CDs in FIG. 4) to the slave controller 20. Therefore, the master controller 10 is unable to determine whether the transmitted data has been successfully received by the slave controller 20. That is, even if a communication error occurs, the master controller 10 is unable to detect the occurrence of the communication error.

In this case, the master controller 10 knows the occurrence of the communication error by receiving a failure (fail) signal issued as a result of an abnormal operation performed by a control target in a functional block due to reception of erroneous data.

On the other hand, in the case of applying this exemplary embodiment, communication monitoring data TCDs and communication monitoring response data TCDr are transmitted and received between the master controller 10 and the slave controller 20. The master controller 10 determines whether the transmitted communication monitoring data TCDs has been successfully received by the slave controller 20.

If it is determined that the communication monitoring data TCDs has been successfully received, it is inferred that serial communication is normally performed between the master controller 10 and the slave controller 20 and that the slave controller 20 is operating normally.

Even if it is determined that the communication monitoring data TCDs has not been successfully received, it is possible to determine whether the error is a temporary communication error caused by noise, by retransmitting communication monitoring data TCDs and receiving communication monitoring response data TCDr. That is, if it is determined that the retransmitted communication monitoring data TCDs has been successfully received, it may be determined that the error is a temporary communication error caused by noise. In a case of a communication error caused by noise, it is possible to evaluate the frequency of noise occurrences (frequency of noise contamination) by repeatedly transmitting communication monitoring data TCDs and receiving communication monitoring response data TCDr.

Note that a method (mirror method) is available in which data CDs for control transmitted from the master controller 10 to the slave controller 20 is returned from the slave controller 20 to the master controller 10, thereby determining whether the CDs has been successfully transmitted from the master controller 10 to the slave controller 20.

However, in the mirror method, the communication channel Rx for reception in the serial communication line 30 is occupied by the returned data CDs. That is, the communication rate of the serial communication line 30 doubles the communication rate in a case of not using the mirror method. As a result, transmission of data CDr for a response from a control target may be interrupted. Accordingly, the image forming apparatus 100 might not be able to attain a communication rate needed.

In contrast, in the case of applying this exemplary embodiment, communication monitoring data TCDs is cyclically inserted between pieces of data CDs used to control a functional block. Communication monitoring response data TCDr that is returned is transmitted in response to the communication monitoring data TCDs. Therefore, interruption in transmission of data CDr for a response is suppressed.

Inference about Power Reset Factor

Next, a description is given of a case where a power reset occurs in the slave controller 20. A power reset occurs when a power failure occurs in the slave controller 20, when an external reset signal is input, or when the WDT 23 times out, for example.

First, it is assumed that a failure occurs in the power of the slave controller 20 and the supply voltage drops below the minimum voltage, which results in an occurrence of a power reset in the slave controller 20.

In this case, the power monitoring circuit 24 detects the supply voltage dropping below the minimum voltage and transmits a signal to the memory timing generation circuit 83 of the communication monitoring circuit 22.

Then, the memory timing generation circuit 83 generates a memory timing for writing data that indicates the tap position of the DP 81 to the NV memory 82 and writes the data indicating the tap position of the DP 81 to the NV memory 82.

In the NV memory 82, data indicating the tap position of the DP 81 is set so as to enable writing of data indicating the tap position of the DP 81. Data indicating the tap position of the DP 81 is written to (stored in) the NV memory 82 only when the memory timing generation circuit 83 generates a memory timing.

Writing to the NV memory 82 is performed only when the supply voltage drops below the minimum voltage, and therefore, even if there is a limit on the number of times rewriting (writing) to the NV memory 82 is performed, a situation where the number of times rewriting is performed reaches the limit is suppressed.

As described above, the communication monitoring circuit 22 continues operating until data indicating the tap position of the DP 81 is written to the NV memory 82.

Thereafter, when the supply voltage of the slave controller 20 is recovered, the tap position of the DP 81 is set in accordance with the data (NV memory value) that has been written to the NV memory 82 and that indicates the tap position of the DP 81.

Then, analog signal output DPOa from the DP 81 is converted into digital signal output DPOd by the A/D module 53, and the digital signal output DPOd is transmitted to the master controller 10, as described above.

The master controller 10 stores, in a log, count patterns CP in pieces of communication monitoring data TCDs that have been transmitted to the slave controller 20. Therefore, it is determined at which point in time a failure in the power of the slave controller 20 occurred, on the basis of digital signal output DPOd transmitted from the slave controller 20 to the master controller 10 and the numbers of pulses specified by the count patterns CP in the pieces of communication monitoring data TCDs.

If the tap position of the DP 81 matches the tap position set in accordance with the count pattern CP in communication monitoring data TCDs that has been last transmitted, it is inferred that a power reset has occurred in the slave controller 20 due to drop of the supply voltage of the slave controller 20.

In a case where a power reset caused by the WDT 23 has occurred in the slave controller 20, the power monitoring circuit 24 does not operate, as seen from FIG. 2. Therefore, the tap position of the DP 81 stored in the NV memory 82 does not match the tap position set in accordance with the count pattern CP in the communication monitoring data TCDs that has been last transmitted, and is supposed to match the tap position set in accordance with the count pattern CP in communication monitoring data TCDs transmitted earlier.

Accordingly, it is possible to infer that the power reset that occurs in the slave controller 20 is not caused by the supply voltage dropping below the minimum voltage.

In a case where an external reset signal causes a power reset in the slave controller 20, the reset signal is input into the power reset circuit 25. The power monitoring circuit 24 does not operate also in this case, as seen from FIG. 2. Therefore, the tap position of the DP 81 written to the NV memory 82 does not match the tap position set in accordance with the count pattern CP in the communication monitoring data TCDs that has been last transmitted, and is supposed to match the tap position set in accordance with the count pattern CP in communication monitoring data TCDs transmitted earlier.

It is possible to infer whether a power reset that occurs in the slave controller 20 is caused by the WDT 23 or by an external reset signal, on the basis of a timing at which communication monitoring data TCDs including a count pattern CP is transmitted, the tap position of the DP 81 stored in the NV memory being set in accordance with the count pattern CP.

On the other hand, in the case of not applying this exemplary embodiment, communication monitoring data TCDs and communication monitoring response data TCDr are not exchanged, and therefore, it is not possible to infer whether a power reset that occurs in the slave controller 20 is caused by the supply voltage of the slave controller 20 dropping below the minimum voltage, by the WDT 23, or by an external reset signal.

The I/O extension circuit 21 is constituted by an ASIC, for example.

In this case, many IF modules are provided to the I/O extension unit 50 by taking into consideration versatility. The IF modules include versatile IF modules, such as an IF module that outputs serial signals and an IF module that functions as an A/D converter which converts an analog signal from a sensor into a serial signal, in addition to a dedicated module that controls a specific control target in a specific functional block. Some of the versatile IF modules are not used and are redundant.

Accordingly, in this exemplary embodiment, among the IF modules that are not used to control functional blocks, the IF module that functions as an A/D converter is used as the A/D module 53, and the IF module that serially outputs pulse signals is used as the pulse signal output module 54.

That is, by providing the communication monitoring circuit 22 in addition to the I/O extension circuit 21 constituted by an ASIC that takes into consideration versatility, serial communication between the master controller 10 and the slave controller 20 is monitored, and a factor responsible for a power reset that occurs in the slave controller 20 is inferred.

The communication control unit 15 in the master controller 10 and the communication control unit 40 of the I/O extension circuit 21 in the slave controller 20 are structured on the basis of an SPI communication standard and are not easily modified. Therefore, in this exemplary embodiment, the communication monitoring circuit 22 is provided outside the communication control unit 15 and the communication control unit 40 without modifying the communication control unit 15 and the communication control unit 40, and serial communication is monitored.

Furthermore, in this exemplary embodiment, the DP 81 is used for the communication monitoring circuit 22, the tap position of the DP 81 is moved in accordance with pulses from the pulse signal output module 54 in the I/O extension unit 50, and analog signal output DPOa from the DP81 is converted into digital signal output DPOd by the A/D module 53. As a result, the number of IF modules in the I/O extension unit 50 which are connected to the communication monitoring circuit 22 is reduced to two (the A/D module 53 and the pulse signal output module 54). That is, by using the DP 81, the communication monitoring circuit 22 is configured to have a smaller number of terminals and is easily mounted on (connected to) the I/O extension circuit 21 that is constituted by an ASIC.

In other words, a function of monitoring serial communication is implemented without changing the configuration of the I/O extension circuit 21 that is constituted by an ASIC.

Calibration Routine

In this exemplary embodiment, analog signal output DPOa from the DP 81 is converted into digital signal output DPOd. On the basis of the digital signal output DPOd, it is determined whether data is successfully transmitted from the master controller 10 to the slave controller 20.

Therefore, it is needed to correctly calculate the tap position of the DP 81 from digital signal output DPOd converted from analog signal output DPOa.

Here, a calibration routine for calibrating a correspondence between digital signal output DPOd and the tap position of the DP 81 is provided.

Figure 5:
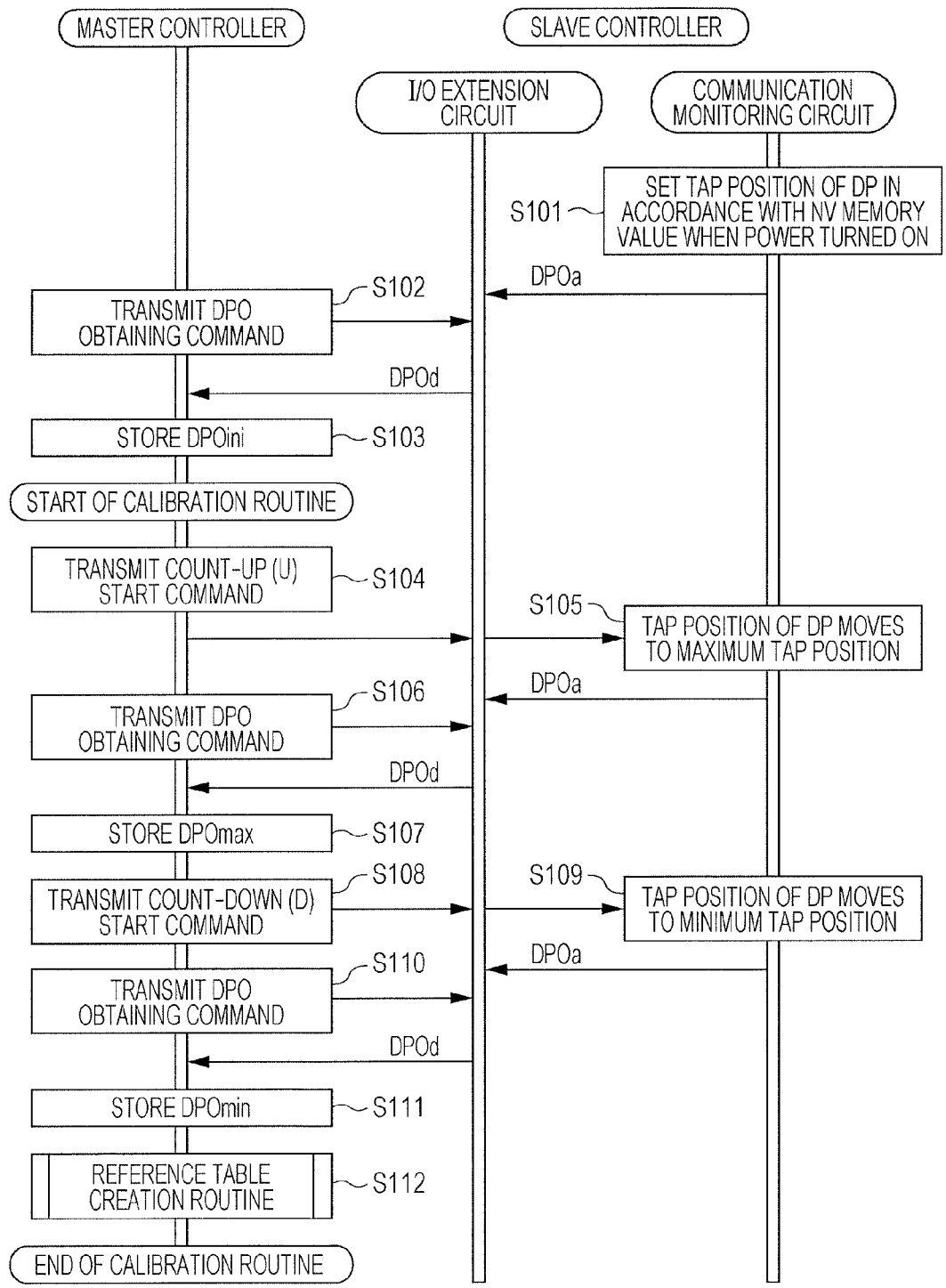
FIG. 5 is a sequence chart relating to the master controller, and an input/output (I/O) extension circuit and the communication monitoring circuit in the slave controller, in a calibration routine.

FIG. 5 is a sequence chart relating to the master controller 10, and the I/O extension circuit 21 and the communication monitoring circuit 22 in the slave controller 20, in the calibration routine. FIG. 5 includes a sequence when the power of the master controller 10 and the power of the slave controller 20 are turned on. Note that a sequence when the power of the slave controller 20 is turned on in a state where the power of the master controller 10 has been turned on is similar to the sequence illustrated in FIG. 5.

First, when the power of the master controller 10 and the power of the slave controller 20 are turned on, the tap position of the DP 81 is set in accordance with an NV memory value written to the NV memory 82 (step S101).

When the tap position of the DP 81 is set, the DP 81 outputs analog signal output DPOa that corresponds to the tap position to the A/D module 53 in the I/O extension circuit 21. Then, the A/D module 53 outputs digital signal output DPOd that corresponds to the analog signal output DPOa.

Here, the master controller 10 transmits a DPO obtaining command that provides an instruction for obtaining the digital signal output DPOd to the slave controller 20 (step S102). Then, the I/O extension circuit 21 of the slave controller 20 transmits the digital signal output DPOd to the master controller 10. Transmission of digital signal output DPOd is performed via the I/O control module 51 and the communication control unit 40 in the I/O extension circuit 21, which is hereinafter simply expressed, that is, transmission is performed by the I/O extension circuit 21.

The master controller 10 stores the received digital signal output DPOd in the RAM 13 at a predetermined address (step S103). To be exact, in the master controller 10, the reception module 17 receives digital signal output DPOd, and the CPU 11 stores the digital signal output DPOd in the RAM 13, which is hereinafter simply expressed, that is, the master controller 10 stores received digital signal output DPOd in the RAM 13.

The digital signal output DPOd stored in the RAM 13 in this case is digital signal output DPOd obtained when the power of the master controller 10 and the power of the slave controller 20 are turned on and is an initial value, which is referred to as DPOini here.

At this point, the calibration routine starts.

First, the master controller 10 transmits a command (count-up (U) start command) for moving the tap position of the DP 81 up to the maximum tap position, to the I/O extension circuit 21 of the slave controller 20 (step S104). As a result, the tap position of the DP 81 of the communication monitoring circuit 22 moves to the maximum tap position (step S105). Then, the DP 81 outputs analog signal output DPOa that corresponds to the maximum tap position to the I/O extension circuit 21.

The master controller 10 transmits a DPO obtaining command to the slave controller 20 (step S106). Then, the I/O extension circuit 21 of the slave controller 20 transmits digital signal output DPOd that corresponds to the analog signal output DPOa to the master controller 10.

The master controller 10 stores the received digital signal output DPOd in the RAM 13 at a predetermined address (step S107). The digital signal output DPOd stored in the RAM 13 in this case is digital signal output DPOd obtained when the tap position of the DP 81 is set to the maximum tap position and is the maximum value, which is referred to as digital signal output DPOmax.

Next, the master controller 10 transmits a command (count-down (D) start command) for moving the tap position of the DP 81 down to the minimum tap position, to the I/O extension circuit 21 of the slave controller 20 (step S108). Then, the tap position of the DP 81 of the communication monitoring circuit 22 moves to the minimum tap position (step S109). Then, the DP 81 outputs analog signal output DPOa that corresponds to the minimum tap position to the I/O extension circuit 21.

The master controller 10 transmits a DPO obtaining command to the slave controller 20 (step S110). Then, the I/O extension circuit 21 of the slave controller 20 transmits digital signal output DPOd that corresponds to the analog signal output DPOa to the master controller 10.

The master controller 10 stores the received digital signal output DPOd in the RAM 13 at a predetermined address (step S111). The digital signal output DPOd stored in the RAM 13 in this case is digital signal output DPOd obtained when the tap position of the DP 81 is set to the minimum tap position and is the minimum value, which is referred to as digital signal output DPOmin.

Thereafter, as described below, the master controller 10 creates a reference table on the basis of SN, which is the number of taps of the DP 81, the digital signal output DPOmax, and the digital signal output DPOmin (reference table creation) (step S112).

Then, the calibration routine ends.

The calibration routine described above is executed when the power of the master controller 10 and the power of the slave controller 20 are turned on, or when the power of the slave controller 20 is turned on.

Next, a routine of creating the reference table (reference table creation routine) is described.

Figure 6:
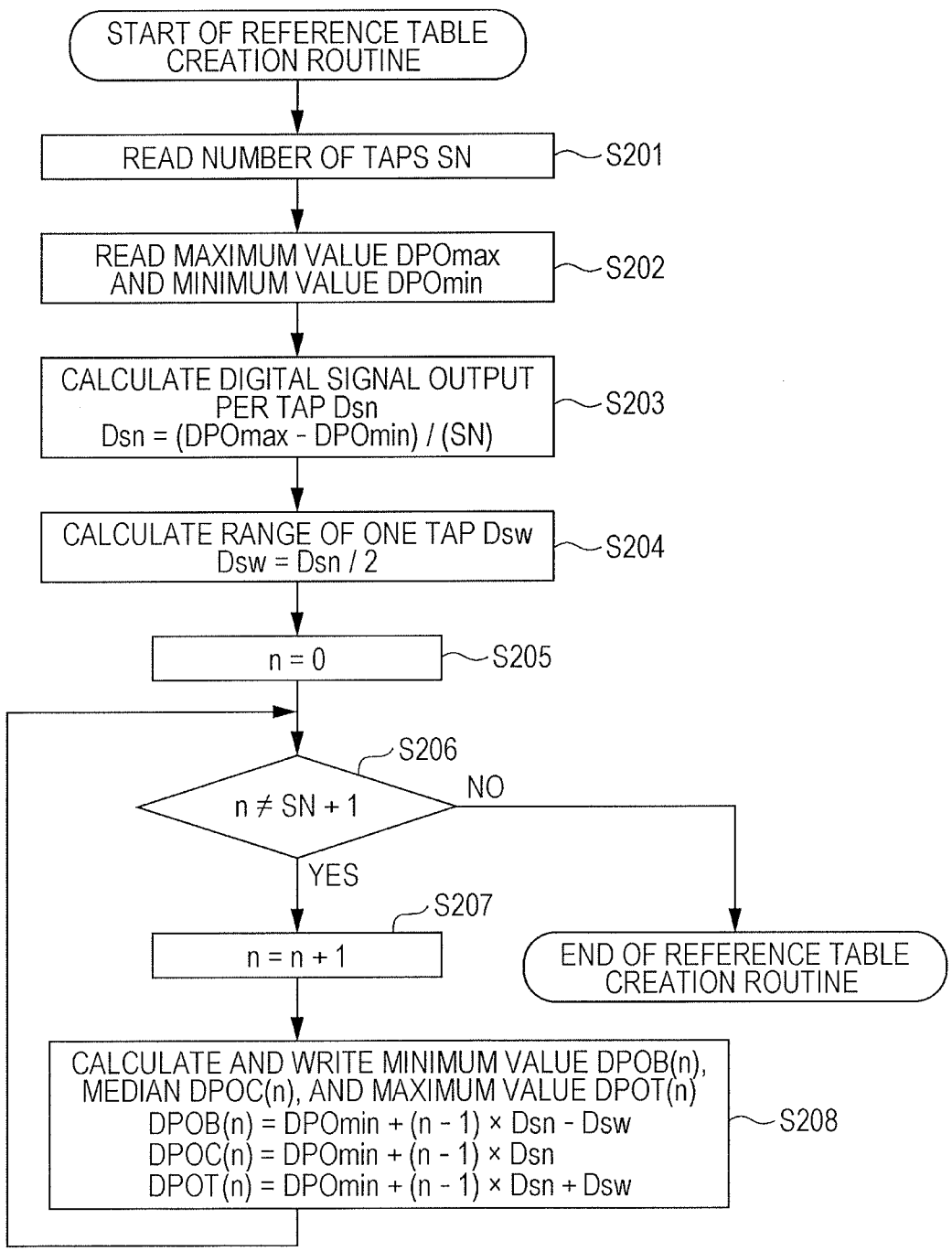
FIG. 6 is a flowchart for describing a routine (reference table creation routine) of creating a reference table.

FIG. 6 is a flowchart for describing a routine (reference table creation routine) of creating the reference table.

FIG. 7 is a diagram for describing an example of the reference table.

First, a description of the reference table creation routine is given with reference to FIG. 6.

The CPU 11 of the master controller 10 reads SN, which is the number of taps of the DP 81, stored in the RAM 13 (step S201).

Next, the CPU 11 reads the digital signal output DPOmax that corresponds to the maximum tap position and the digital signal output DPOmin that corresponds to the minimum tap position, the DPOmax and the DPOmin being stored in the RAM 13 (step S202).

The CPU 11 calculates Dsn, which is digital signal output per tap of the DP 81, using an expression Dsn=(DPOmax−DPOmin)/SN (step S203).

Next, the CPU 11 calculates Dsw, which is the range of the upper limit or the lower limit of one tap of the DP 81, using an expression Dsw=Dsn/2 (step S204).

Next, a variable n is set to 0 (step S205), and it is determined whether the variable n is equal to SN+1 (the number of taps+1) (step S206).

If the result of determination in step S206 is positive (Yes), that is, if the variable n is not equal to SN+1 (the number of taps+1), the variable n is incremented by 1 (step S207).

Then, the CPU 11 calculates DPOB(n), DPOC(n), and DPOT(n), which respectively represent the minimum value, the median, and the maximum value at each tap position, using expressions, that is, DPOB(n)=DPOmin+(n−1)×Dsn−Dsw, DPOC(n)=DPOmin+(n−1)×Dsn, and DPOT(n)=DPOmin+(n−1)×Dsn+Dsw, and writes the values to the RAM 13 at predetermined addresses, respectively (step S208).

Then, the flow returns to step S206.

On the other hand, if the result of determination in step S206 is negative (No), that is, if the variable n is equal to SN+1 (the number of taps+1), the reference table creation routine ends.

In this way, the reference table illustrated in FIG. 7 is created. Note that, in FIG. 7, n=1 corresponds to the minimum tap position of the DP 81, and n=SN corresponds to the maximum tap position of the DP 81.

Although it is assumed here that the reference table is created in the RAM 13, the reference table may be created in a rewritable nonvolatile memory.

By referring to the created reference table, the tap position corresponding to the digital signal output DPOini, which is the initial value, stored in the RAM 13 in step S102 in FIG. 5 is known.

Note that the reference table may be created using other routines.

Communication Monitoring Data TCDs

Next, a description is given of the count pattern CP, which is data that is included in communication monitoring data TCDs and that specifies the number of pulses.

FIG. 8 is a diagram illustrating examples of the count pattern CP included in communication monitoring data TCDs.

Here, it is assumed that SN, which is the number of taps of the DP 81, is 128, and that CPN, which is the number of count patterns CP, is six, for example. Hereinafter, each count pattern CP is represented by CP[m] (m=1 to 6 (CPN)).

The count pattern CP[m] is represented by eight bits, and the lower-order seven bits represent CPT[m], which is the number of steps (count) by which the tap position of the DP 81 is moved. The count CPT[m] is 85 for CP[1], 42 for CP[2], 12 for CP[3], 51 for CP[4], 1 for CP[5], and 63 for CP[6].

Specifically, the count patterns CP[1] and CP[2] are each a bit toggle pattern where the lower-order seven bits are a sequence of alternating 0s and 1s. The count patterns CP[3] and CP[4] are each a bit double pattern where the lower-order seven bits are a sequence in which two 0s and two 1s alternately appear. The count patterns CP[5] and CP[6] are each a successive bit pattern where the lower-order seven bits include three or more successive 0s or 1s.

Note that other bit patterns may be used.

Figure 9:
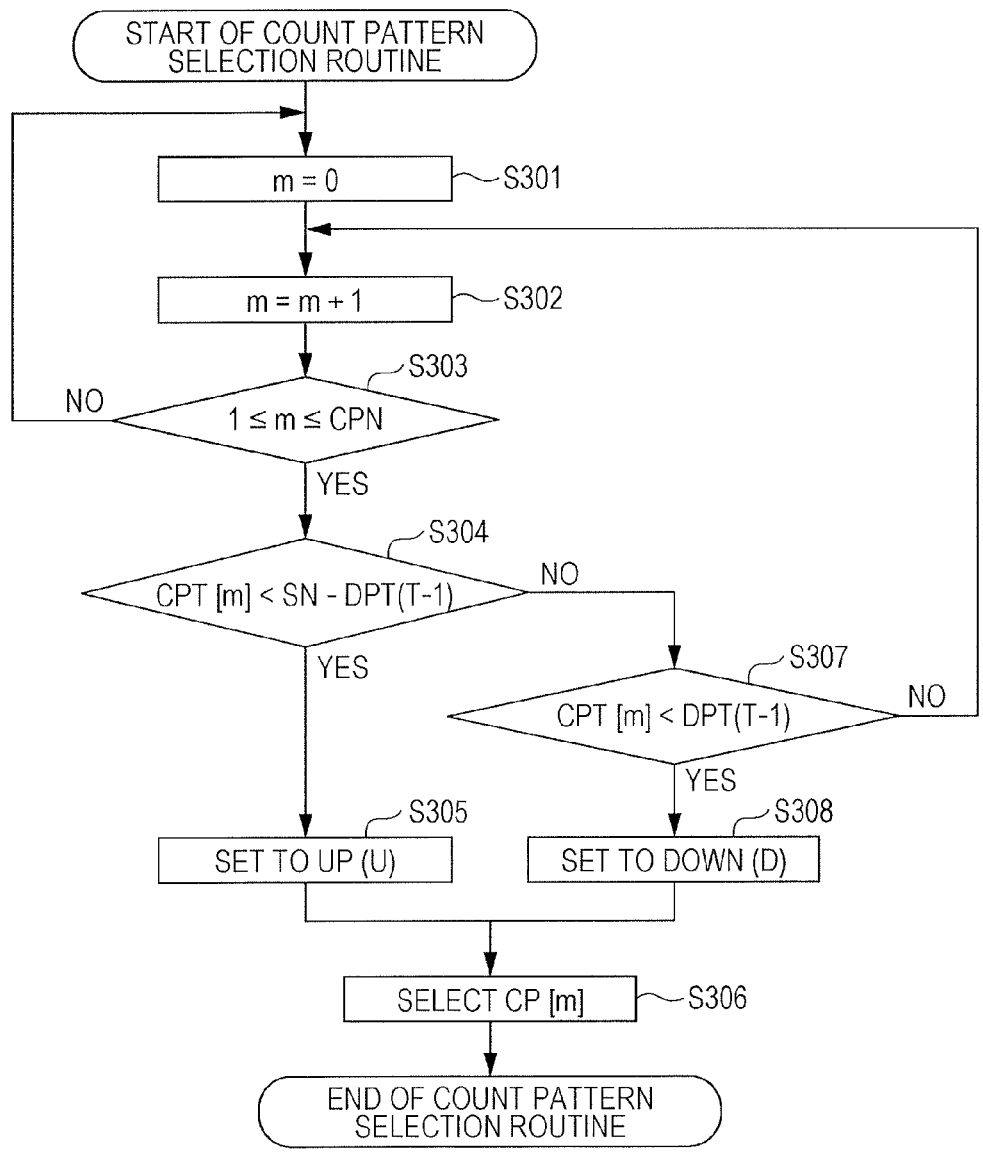
FIG. 9 is a flowchart for describing a routine (count pattern selection routine) of selecting a count pattern CP to be set in communication monitoring data TCDs.

FIG. 9 is a flowchart for describing a routine (count pattern selection routine) of selecting a count pattern CP to be set in communication monitoring data TCDs.

First, a variable m is set to 0 (step S301). Next, the variable m is incremented by 1 (step S302). Then, it is determined whether the variable m is equal to or larger than 1 and is equal to or less than CPN (step S303).

If the result of determination in step S303 is positive (Yes), that is, if the variable m is equal to or larger than 1 and is equal to or less than CPN, it is determined, for the count pattern CP[m], whether CPT[m], which is the count by which the tap position is moved, is less than a value obtained by subtracting a tap position DPT(T−1) of the DP 81 that has been last set from SN, which is the number of taps of the DP 81 (that is, whether an expression CPT[m]<SN−DPT(T−1) is satisfied) (step S304).

The tap position DPT(T−1) is obtained from digital signal output DPOd last received by referring to the reference table.

A case where the result of determination in step S303 is negative (No) will be described below.

If the result of determination in step S304 is positive (Yes), that is, if the expression CPT[m]<SN−DPT(T−1) is satisfied, the tap position of the DP 81 does not reach the maximum tap position even when the tap position is moved upward by the count CPT[m]. Therefore, the tap position of the DP 81 is set in an up (U) direction (is set to "up" (U)) (step S305).

The count pattern CP[m] that corresponds to the count CPT[m] is selected (step S306). Then, the count pattern selection routine ends.

On the other hand, if the result of determination in step S304 is negative (No), that is, if an expression CPT[m]≥SN−DPT(T−1) is satisfied, it is determined whether CPT[m], which is the count by which the tap position is moved, is less than the tap position DPT(T−1) of the DP 81 that has been last set (that is, whether an expression CPT[m]<DPT(T−1) is satisfied) (step S307).

If the result of determination in step S307 is positive (Yes), that is, if the expression CPT[m]<DPT(T−1) is satisfied, the tap position of the DP 81 does not reach the minimum tap position, even when the tap position is moved downward by the count CPT[m]. Therefore, the tap position of the DP 81 is set in a down (D) direction (is set to "down" (D)) (step S308).

The count pattern CP[m] that corresponds to the count CPT[m] is selected (step S306). Then, the count pattern selection routine ends.

If the result of determination in step S307 is negative (No), that is, if an expression CPT[m]≥DPT(T−1) is satisfied, the tap position of the DP 81 reaches the minimum tap position when the tap position is moved downward. Therefore, the flow returns to step S302, and the variable m is incremented by 1. Then, in step S303 and the succeeding steps, it is determined whether the next count pattern CP[m] illustrated in FIG. 8 is selectable.

If the result of determination in step S303 is negative (No), that is, if the variable m is less than 1 or larger than CPN, which is the number of count patterns CP, namely, if the variable m exceeds CPN, the flow returns to step S301, and the variable m is set to 0. Then, in step S303 and the succeeding steps, it is determined whether the first count pattern CP[1] illustrated in FIG. 8 is selectable.

In this way, the count patterns CP[m] illustrated in FIG. 8 are checked one by one. After all of the count pattern CP[1] to the count pattern CP[CPN] have been checked, checking is performed from the first count pattern CP[1] again. That is, it is possible to suppress a situation where only a specific count pattern is used.

Note that other routines may be used to select a count pattern CP.

By selecting CPT[m], which is the count by which the tap position is moved, selection of a tap position that exceeds the maximum tap position of the DP 81 and selection of a tap position that is below the minimum tap position of the DP 81 are suppressed.

In a case where a tap position that exceeds the maximum tap position is selected, or in a case where a tap position that is below the minimum tap position is selected, the tap position DPT that has been read becomes the maximum tap position or the minimum tap position. That is, the tap position that is actually set is different from a tap position obtained on the basis of the count CPT that has been set.

Communication Monitoring

Figure 10:
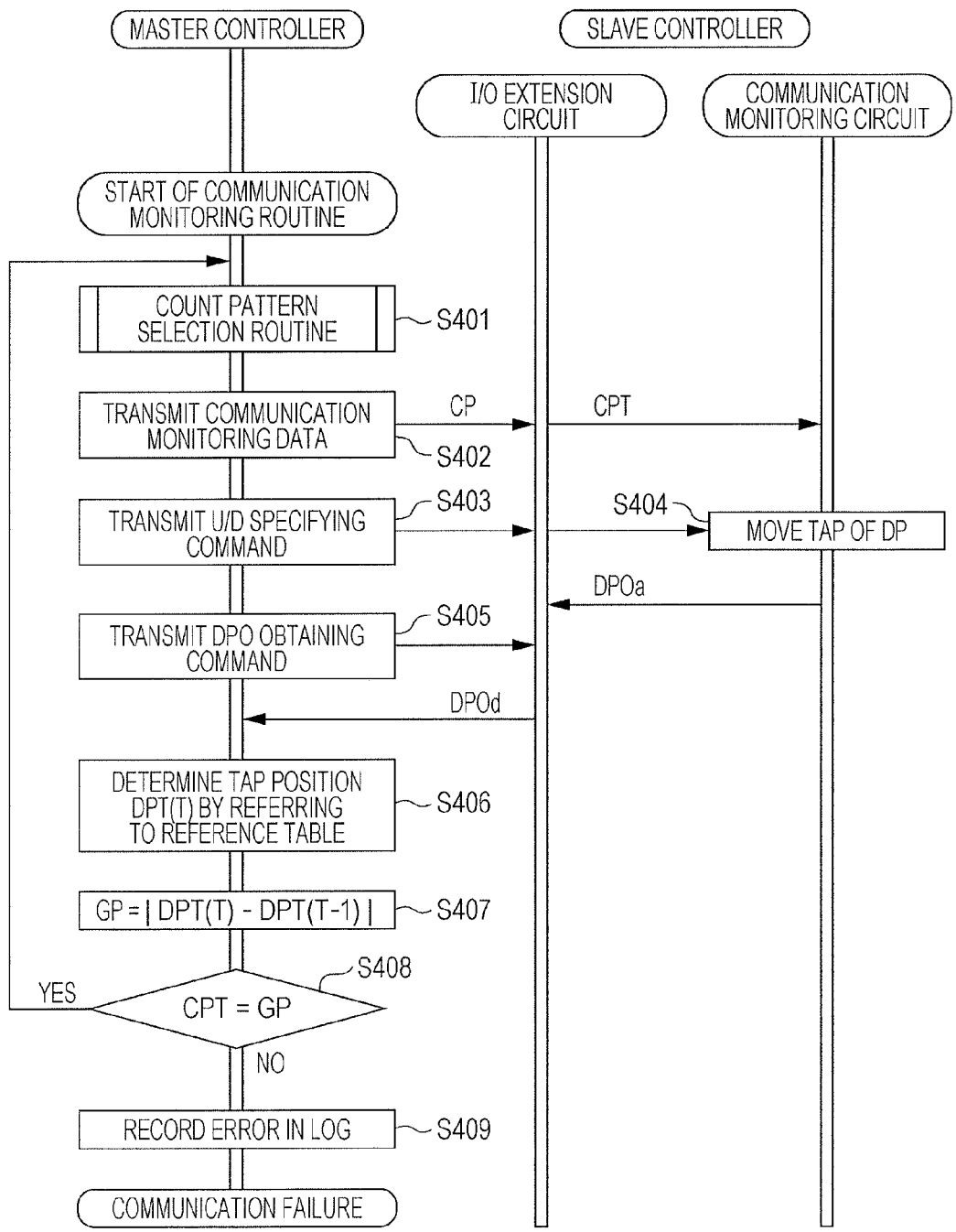
FIG. 10 is a sequence chart relating to the master controller, and the I/O extension circuit and the communication monitoring circuit in the slave controller, in a communication monitoring routine.

FIG. 10 is a sequence chart relating to the master controller, and the I/O extension circuit 21 and the communication monitoring circuit 22 in the slave controller 20, in a communication monitoring routine.

The master controller 10 selects a count pattern CP that is to be set in communication monitoring data TCDs by executing the count pattern selection routine illustrated in FIG. 9 on the basis of the last tap position DPT(T-1) of the DP 81 (count pattern selection routine) (step S401).

The master controller 10 transmits the communication monitoring data TCDs (the count pattern CP) to the I/O extension circuit 21 of the slave controller 20 (step S402). Next, the master controller 10 transmits a command (U/D command) that specifies a direction (U/D) in which the tap position is moved (step S403).

Then, the DP 81 moves the tap position in accordance with the count CPT specified by the count pattern CP in the direction (U/D) in which the tap position is moved (step S404).

Accordingly, the DP 81 outputs analog signal output DPOa to the I/O extension circuit 21 of the slave controller 20.

The master controller 10 transmits a DPO obtaining command to the slave controller 20 (step S405). Then, digital signal output DPOd is transmitted from the I/O extension circuit 21 of the slave controller 20 to the master controller 10.

The master controller 10 refers to the reference table illustrated in FIG. 7, and determines (calculates) a tap position DPT(T) that corresponds to the digital signal output DPOd (step S406).

Next, the master controller 10 calculates a difference GP (an absolute value) between the last tap position DPT(T-1) stored in the RAM 13 and the determined tap position DPT(T) (step S407).

Next, it is determined whether the difference GP is equal to the count CPT specified by the count pattern CP in the transmitted communication monitoring data TCDs (step S408).

If the result of determination in step S408 is positive (Yes), that is, if the difference GP is equal to the count CPT specified by the count pattern CP in the transmitted communication monitoring data TCDs, it is determined (inferred) that no error has occurred in communication and that the slave controller 20 is operating normally. Therefore, the flow returns to step S401, and the communication monitoring routine is continuously executed.

On the other hand, if the result of determination in step S408 is negative (No), that is, if the difference GP is not equal to the count CPT specified by the count pattern CP in the transmitted communication monitoring data TCDs, it is determined that an error has occurred in communication (a communication failure has occurred). In this case, the master controller 10 records the error in a log in the RAM 13 (step S409).

If it is determined that a communication failure has occurred, the power of the slave controller 20 may be reset. Alternatively, the flow may return to step S401, and communication monitoring data TCDs may be retransmitted to thereby determine whether a communication error recurs. If a communication error does not recur in this case, it is conceivable that the communication failure is a temporary communication error that has occurred due to noise. Therefore, the power of the slave controller 20 may be reset in a case where a communication error recurs.

Even in a case where the master controller 10 fails to transmit a DPO obtaining command in accordance with a predetermined cycle (the cycle tp in FIG. 3), the tap position of the DP 81 in the next cycle is calculated and checked from the transmitted communication monitoring data TCDs and a setting relating to the direction (U/D) in which the tap position is moved.

Note that, in a case where the power is recovered after the power of the slave controller 20 has been reset, the tap position of the DP 81 is set in accordance with the NV memory value as described with reference to the calibration routine illustrated in FIG. 5 (step S101 in FIG. 5), and digital signal output DPOd is thereafter transmitted to the master controller 10 and stored in the RAM 13 as the initial digital signal output DPOini. Therefore, as illustrated in step S406 in FIG. 10, it is possible to infer a factor responsible for the power reset by determining the tap position DPT from the reference table and referring to the log of the transmitted communication monitoring data TCDs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a controller configured to control formation of an image by the image forming apparatus, the controller including a master controller and a slave controller; and a serial communication line connecting the master controller with the slave controller, and being for serial communication, the master controller including:
an arithmetic module configured to generate first serial data for communication monitoring which is transmitted to the slave controller and used to monitor serial communication with the slave controller via the serial communication line, and to monitor whether the first serial data has been successfully received by the slave controller in accordance with second serial data received from the slave controller via the serial communication line, the slave controller including:
a pulse signal output module configured to output pulse signals for a number of pulses, the number of pulses being set from the first serial data received from the master controller via the serial communication line in accordance with the first serial data,
an analog voltage output module configured to receive the pulse signals for the number of pulses, change an analog voltage in accordance with the number of pulses, and output the analog voltage, and
an analog/digital conversion module that converts the analog voltage output from the analog voltage output module into the second serial data by performing analog/digital conversion.

2. The image forming apparatus according to claim 1, wherein, in response to the master controller determining that the first serial data was not received by the slave controller, the master controller records an error and retransmits the first serial data.

3. The image forming apparatus according to claim 1, wherein, in a predetermined cycle, data for control and the first serial data for communication monitoring are transmitted to the slave controller.

4. The image forming apparatus according to claim 3, wherein, in the predetermined cycle, data for a response and the second serial data are transmitted to the master controller.

5. A communication monitoring system comprising:
a master controller;
a slave controller configured to be controlled by the master controller; and
a serial communication line configured to be used in serial communication between the master controller and the slave controller,
the master controller including an arithmetic module configured to generate first serial data for communication monitoring which is transmitted to the slave controller and used to monitor serial communication with the slave controller via the serial communication line, and to monitor whether the first serial data has been successfully received by the slave controller in accordance with second serial data received from the slave controller via the serial communication line,
the slave controller including:
a pulse signal output module configured to output pulse signals for a number of pulses, the number of pulses being set from the first serial data received from the master controller via the serial communication line in accordance with the first serial data,
an analog voltage output module configured to receive the pulse signals for the number of pulses, change an analog voltage in accordance with the number of pulses, and output the analog voltage, and
an analog/digital conversion module configured to convert the analog voltage output from the analog voltage output module into the second serial data by performing analog/digital conversion.

6. The communication monitoring system according to claim 5, wherein the slave controller further includes:
a power monitoring module configured to monitor a supply voltage of the slave controller,
a rewritable nonvolatile memory configured to store data used to set the analog voltage to be output from the analog voltage output module, and
a memory timing generation module configured to generate a memory timing for writing, to the nonvolatile memory, the data used to set the analog voltage to be output from the analog voltage output module, in response to reception of a signal indicating detection of the supply voltage dropping below a predetermined minimum voltage from the power monitoring module.

7. The communication monitoring system according to claim 6, wherein in the slave controller, the analog voltage to be output from the analog voltage output module is set in accordance with the data written to the nonvolatile memory when a power of the slave controller is turned on.

8. The communication monitoring system according to claim 7, wherein
the analog voltage output module in the slave controller includes a digital potentiometer.

9. The communication monitoring system according to claim 6, wherein the analog voltage output module in the slave controller includes a digital potentiometer.

10. The communication monitoring system according to claim 5, wherein the analog voltage output module in the slave controller includes a digital potentiometer.

11. A communication monitoring circuit comprising:
an analog voltage output module configured to receive pulse signals for a number of pulses specified in serial data for communication monitoring which is used to monitor serial communication via a serial communication line, change an analog voltage in accordance with the number of pulses, and output the analog voltage;
a rewritable nonvolatile memory configured to store data used to set the analog voltage to be output from the analog voltage output module; and
a memory timing generation module configured to generate a memory timing for writing, to the nonvolatile memory, the data used to set the analog voltage to be output from the analog voltage output module.

12. The communication monitoring circuit according to claim 11, wherein the analog voltage output module includes a potentiometer.

13. The communication monitoring circuit according to claim 12, wherein the potentiometer includes resistors that respectively connect to an output terminal in accordance with the received pulse signals.

14. The communication monitoring circuit according to claim 13, wherein a connection point of potentiometer to the output terminal changes in accordance with the received pulse signals, and the data stored by the rewritable nonvolatile memory indicates a position of the connection point of the potentiometer.

* * * * *